US011409370B1

(12) United States Patent
Pavlou

(10) Patent No.: US 11,409,370 B1
(45) Date of Patent: Aug. 9, 2022

(54) DEVICE GESTURE RECOGNITION SYSTEM TO CONTROL PRIVACY MODE

(71) Applicant: Citrix Systems, Inc., Ft. Lauderdale, FL (US)

(72) Inventor: Chris Pavlou, Boca Raton, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/318,013

(22) Filed: May 12, 2021

(51) Int. Cl.
*G06F 3/01* (2006.01)
*H04M 3/56* (2006.01)
*H04M 1/72463* (2021.01)
*H04M 1/72454* (2021.01)

(52) U.S. Cl.
CPC ........ *G06F 3/017* (2013.01); *H04M 1/72454* (2021.01); *H04M 1/72463* (2021.01); *H04M 3/567* (2013.01)

(58) Field of Classification Search
CPC ...................................................... G06F 3/017
See application file for complete search history.

(56) References Cited

U.S. PATENT DOCUMENTS

| 2014/0111449 | A1* | 4/2014 | Lee .......................... G06F 3/041 345/173 |
| 2016/0170477 | A1* | 6/2016 | Flack ...................... G06F 21/31 713/323 |
| 2017/0168631 | A1* | 6/2017 | Roberts-Hoffman ........................ G06F 1/1637 |
| 2017/0185808 | A1* | 6/2017 | Zhang ................. G06F 21/6245 |
| 2017/0344123 | A1* | 11/2017 | Venkataraman ........ G06F 3/013 |
| 2020/0090662 | A1* | 3/2020 | Castro ..................... G06F 3/167 |

* cited by examiner

*Primary Examiner* — David E Choi
(74) *Attorney, Agent, or Firm* — Finch & Maloney PLLC

(57) ABSTRACT

A mobile computing device is provided. The device includes a memory, a sensor, and at least one processor coupled to the memory and configured to determine an occurrence of one or more gestures, based on data provided by the sensors, which are indicative of an orientation of the device. The gestures include turning the device face-down or face-up. The at least one processor is further configured to interpret the gestures in response to the determination and adjust a setting for use by an application (e.g., a collaboration application) based on the interpretation. The setting is associated with a privacy mode. A privacy mode on-state setting is associated with muting the microphones of the device and disabling the video transmission from the camera of the device. A privacy mode off-state setting is associated with unmuting the microphones of the device and enabling the video transmission from the camera of the device.

17 Claims, 6 Drawing Sheets

DEVICE GESTURE RECOGNITION SYSTEM TO CONTROL PRIVACY MODE

BACKGROUND

The use of online collaboration tools, such as teleconferencing and meeting applications, is growing increasingly popular as more people work from home and telecommute. These tools and applications provide for content sharing through broadcasting or live streaming of video and audio content from a device to other parties in the meeting or collaboration effort.

SUMMARY

In at least one example, a mobile computing device is provided. The mobile computing device includes a memory; a sensor; and at least one processor coupled to the memory and configured to: determine an occurrence of one or more gestures based on data provided by the sensor, the gestures indicative of an orientation of the mobile computing device; and adjust a setting for use by an application in response to the determination, the setting associated with a privacy mode.

At least some examples of the computer system can include one or more of the following features. The application is a collaboration application. Determine comprises to determine an occurrence of a gesture associated with a privacy mode on-state and adjust comprises one or more of to mute a microphone of the mobile computing device, to disable video transmission from a camera of the mobile computing device, and to suspend screen sharing. Determine comprises to determine an occurrence of a gesture associated with a privacy mode off-state and adjust comprises one or more of to unmute a microphone of the mobile computing device, to enable video transmission from a camera of the mobile computing device, and to resume screen sharing. The at least one processor is further configured to adjust the setting to an on-state in response to determining an occurrence of a first of the gestures, wherein the first gesture comprises turning the mobile computing device face down and leaving the mobile computing device face down for more than a threshold time period, and the at least one processor is further configured to adjust the setting to an off-state in response to determining an occurrence of a second of the gestures, wherein the second gesture comprises turning the mobile computing device face up. The at least one processor is further configured to adjust the setting to an on-state in response to determining an occurrence of a first of the gestures, wherein the first gesture comprises turning the mobile computing device face down and leaving the mobile computing device face down for less than a threshold time period. The at least one processor is further configured to maintain the setting in the on-state in response to determining an occurrence of a second of the gestures, wherein the second gesture comprises turning the mobile computing device face up. The at least one processor is further configured to adjust the setting to an off-state in response to determining an occurrence of a third of the gestures, wherein the third gesture comprises turning the mobile computing device face down followed by turning the mobile computing device face up.

In at least one example, a method for controlling a privacy mode is provided. The method includes determining, by a computer system of a mobile device, an occurrence of one or more gestures based on data provided by a sensor of the mobile device, the gestures indicative of an orientation of the mobile device; and adjusting, by the computer system, a setting for an application in response to the determination, the setting associated with a privacy mode.

At least some examples of the method can include one or more of the following features. The application is a collaboration application. The act of determining comprises determining an occurrence of a gesture associated with a privacy mode on-state and adjusting comprises one or more of muting a microphone of the mobile device, disabling video transmission from a camera of the mobile device, and suspending screen sharing. The act of determining comprises determining an occurrence of a gesture associated with a privacy mode off-state and adjusting comprises one or more of unmuting a microphone of the mobile device, enabling video transmission from a camera of the mobile device, and resuming screen sharing. The act of adjusting comprises adjusting the setting to an on-state in response to determining an occurrence of a first of the gestures, wherein the first gesture comprises turning the mobile device face down and leaving the mobile device face down for more than a threshold time period, and adjusting further comprises adjusting the setting to an off-state in response to determining an occurrence of a second of the gestures, wherein the second gesture comprises turning the mobile device face up. The act of adjusting comprises adjusting the setting to an on-state in response to determining an occurrence of a first of the gestures, wherein the first gesture comprises turning the mobile device face down and leaving the mobile device face down for less than a threshold time period. The act of adjusting further comprises maintaining the setting in the on-state in response to determining an occurrence of a second of the gestures, wherein the second gesture comprises turning the mobile device face up. The act of adjusting further comprises adjusting the setting to an off-state in response to determining an occurrence of a third of the gestures, wherein the third gesture comprises turning the mobile device face down followed by turning the mobile device face up.

In at least one example, a non-transitory computer readable medium storing executable sequences of instructions to control a privacy mode is provided. The sequences of instructions include instructions to: determine an occurrence of one or more gestures based on data provided by a sensor of a mobile device, the gestures indicative of an orientation of the mobile device and adjust a setting for a collaboration application in response to the determination, the setting associated with a privacy mode.

At least some examples of the non-transitory computer readable medium can include one or more of the following features. The determination comprises determining an occurrence of a gesture associated with a privacy mode on-state and the adjusting comprises one or more of muting a microphone of the mobile device, disabling video transmission from a camera of the mobile device, and suspending screen sharing. The determination comprises determining an occurrence of a gesture associated with a privacy mode off-state and the adjusting comprises one or more of unmuting a microphone of the mobile device, enabling video transmission from a camera of the mobile device, and resuming screen sharing. Instructions to adjust the setting to an on-state in response to determining an occurrence of a first of the gestures, wherein the first gesture comprises turning the mobile device face down and leaving the mobile device face down for more than a threshold time period, and instructions to adjust the setting to an off-state in response to determining an occurrence of a second of the gestures, wherein the second gesture comprises turning the mobile device face up.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
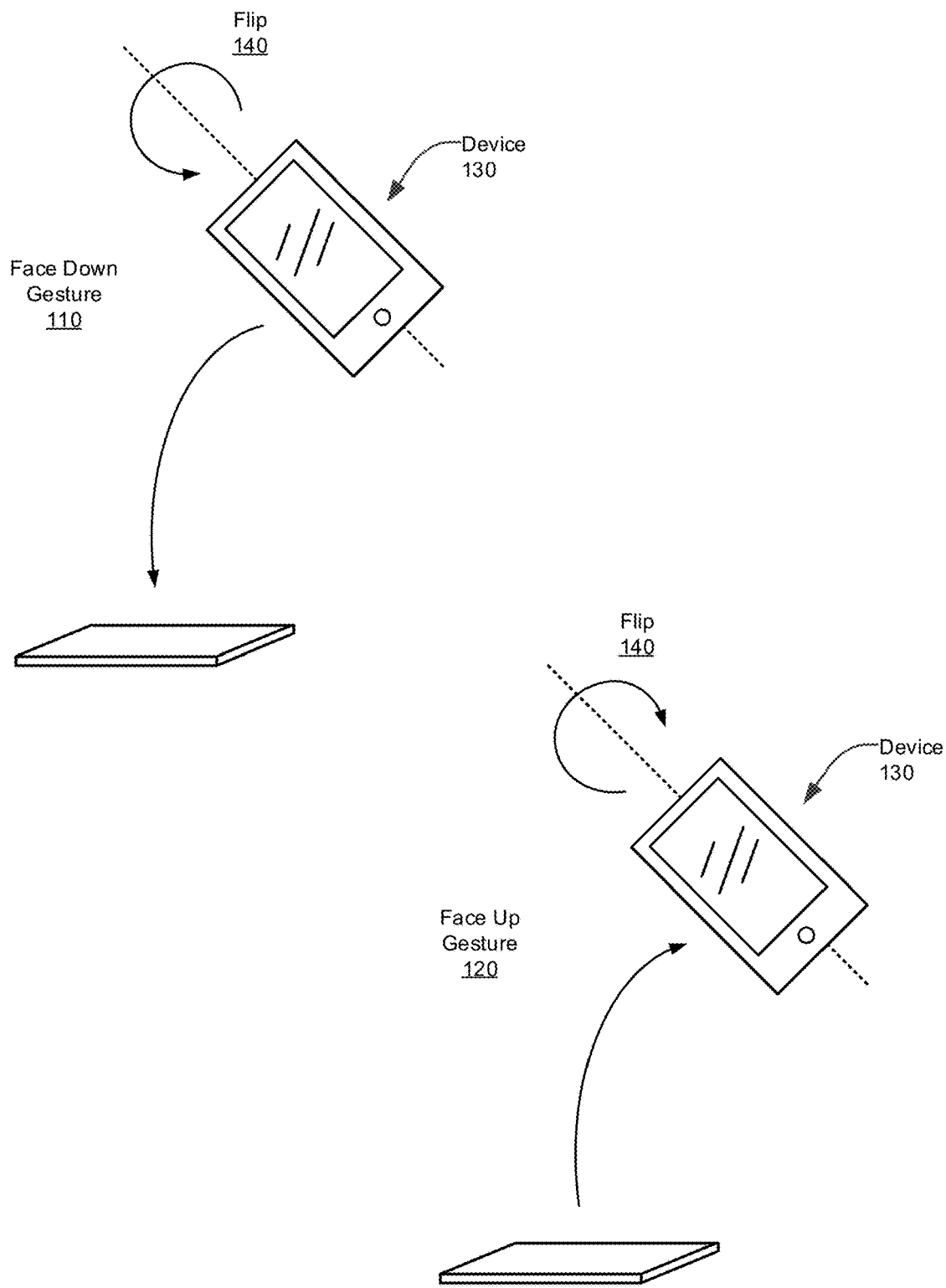
FIG. 1 illustrates two examples of device orientation gestures, in accordance with an example of the present disclosure.

As noted previously, it is sometimes necessary for a participant in an online collaboration system, such as a teleconference or live streaming event, to quickly hide the contents of their video camera feed (or shared screen) or to mute their microphone to prevent sensitive or confidential data from being transmitted. This usually requires the user to stop the collaboration application or access on-screen controls to pause the broadcast or mute the microphone. Such controls are often hidden (either within the application or the Operating System) and require additional user actions to be revealed, which can be cumbersome and time consuming, particularly, for example, if the use is wearing gloves or has wet fingers. The process might include, for example, unlocking the mobile device, opening the application (if not already opened), revealing application controls, and selecting the desired setting. Many other examples of difficulties that can be encountered are possible. The result is that it may take a few seconds to accomplish the task, during which private or sensitive data may be transmitted to others who do not have a need to know about that data.

To address these and other problems, and as summarized above, various examples described herein are directed to systems and methods which allow a user to quickly and efficiently engage a privacy mode that blocks or otherwise restricts the potential transmission of sensitive, personal, or confidential information, whether in audio or video form, over a collaboration application. A collaboration application, as used herein, refers to any application that can broadcast video, screen content, or audio. Examples of such applications include, but are not limited to, a Skype call, a YouTube live stream, a FaceTime call, and a standard or legacy audio phone call. While privacy mode is engaged, screen or video input is obscured, distorted, or otherwise not visible, and audio input is muted or silenced. These systems and methods provide for engagement (and disengagement) of the privacy mode based on device orientation gestures (movement and positioning of the device) that are relatively straightforward and easy to perform. Device orientation gestures, or simply gestures, will be described in greater detail below, and numerous examples will be provided, but as one example, a device orientation gesture can include flipping the device face down (or face up). For example, the user may simply flip the device face down briefly to engage privacy mode and flip the device back to continue using the device in privacy mode. When privacy mode is no longer needed, the user can flip the device face down again and flip back to disable privacy mode. As another example, if the user does not wish to use the device during privacy mode the user can just flip the device face down and leave it face down for the duration of privacy mode. When the device is flipped back after being left face down for more than a short period (e.g., few seconds), privacy mode is disabled. This last example may be referred to as an intermission mode because the user is taking a break from use of the device and wishes to engage privacy mode during that break period.

The device gestures are determined based on data obtained from motion sensors or other sensors that are present in most mobile devices. In some examples, motion sensors may include accelerometers, gyroscopes, magnetometers, or other inertial measurement units. Data indicative of device gestures can typically be provided in 10 milliseconds or less, which means that privacy mode can be engaged almost instantly, providing convenience and security to the user. Additionally, ease of use increases the likelihood that users will adopt the system and use it often and consistently. As described above, existing controls to pause the broadcast or mute the microphone are often hidden (either within the application or the OS) and require additional actions to be revealed, which can be cumbersome and time consuming.

In some examples, the disclosed techniques are implemented, at least in part, by an operating system of the device. In some other examples, a software development kit (SDK) is provided to implement the disclosed techniques, and the collaboration application accesses this SDK through an application programming interface (API).

FIG. 1 illustrates two examples of device orientation gestures 100, in accordance with an example of the present disclosure. The first example is a face down gesture 110 in which the device 130 is flipped 140 into a face down orientation. In some examples, the device may be flipped face down onto a table, desk, or other surface. In some examples the device may be flipped face down but remain in a handheld state. In some examples, face down may include any orientation in which the face of the device (e.g., the screen side) is pointed towards the ground to within a range of +/−10 degrees or +/−20 degrees.

The second example is a face up gesture 120 in which the device 130 is flipped 140 into a face up orientation. In some examples, the device may be flipped face up from off a table, desk, or other surface. In some examples the device may be flipped face up while remaining in a handheld state. In some examples, face up may include any orientation in which the face of the device (e.g., the screen side) is pointed away from the ground (e.g., more than +/−10 degrees or +/−20 degrees away from the ground).

Many variations of these types of gestures are possible starting from an initial position and orientation to a final position and orientation. For example, an initial position may be associated with the device held to the user's ear in which the plane of the device is at an orientation approximately perpendicular to the ground (e.g., within +/−10 degrees or +/−20 degrees of vertical). In some examples, an initial position may be associated with the device handheld and an orientation in which the screen is pointing at the user's face within a range of +/−10 degrees or +/−20 degrees. In some examples, a final position be associated with the device oriented towards the ground within a range of +/−10 degrees or +/−20 degrees. In some examples, a final position be associated with the device held against the front of the user's body (e.g., the chest or stomach area) or against the side of the user's body (e.g., the hip or leg). In some examples, the final position may be in one of the user's pockets. Thus, in an example, a gesture may comprise moving a phone from the user's ear to the user's pocket or moving a tablet from a reading position in front of the user's face to being pressed up against the user's chest. More complex device orientation gestures may comprise sequences of face down, face up, or other gestures at varied time intervals, as will be explained in greater detail below.

In some examples, a series of device gestures cause the privacy mode to be engaged (set to an on-state). For example, privacy mode may be engaged by flipping the device to a face down orientation 110 and back to a face up 120 orientation in a relatively rapid sequence (e.g., within 0.5 to 1 second, 1 second to 2 seconds, or 2 seconds to 4 seconds). The user may then continue to use the device in the normal face up position while privacy mode is engaged (e.g., video and audio blocked from being transmitted).

In some examples, a subsequent repetition of the device gestures that engaged privacy mode, as described above, will cause the privacy mode to be disengaged (set to an off-state). For example, privacy mode may be switched from an on-state to an off-state by flipping the device to a face down orientation 110 and back to a face up orientation 120 in a relatively rapid sequence (e.g., less than a couple of seconds). The user may then continue to use the device in the normal face up position while privacy mode is disengaged (e.g., video and audio transmission is resumed).

In some examples, a series of device gestures cause the privacy mode to be engaged during an intermission or break period in which the device will not be used. For example, the user may be engaged in a conference call with other parties and may need to drop out briefly to attend to another matter. The intermission feature allows the user to easily engage privacy mode on the device during this period and then disengage privacy mode when the user wishes to return to the call. Thus, during the intermission period, video and audio from the user's device can be blocked to prevent the other parties from knowing what the user is doing during the break. Similarly, during a standard phone call, the user might say "can you hold on for a second" and then use the intermission feature to take some private action before returning to the phone call. For example, the intermission feature may be activated by flipping the device face down 110 (e.g., onto a desk or other surface, or while remaining in the user's hand) and leaving it in that position for a period of time during which the user wishes to remain in privacy mode without use of the device. The period of time should exceed a minimum threshold duration (e.g., 1 second, 2 seconds, or 4 seconds) in order to signal the intention to activate the intermission privacy mode as opposed to the device-in-use privacy mode previously described. The user can then end the intermission and disengage privacy mode by picking up the device (e.g., flipping it back to face up 120).

As will be understood in view of this disclosure, the systems and methods for adjusting the privacy mode settings of a collaboration application, based on device orientation gestures, provided herein have several advantages over existing methods which rely on user manipulation of on screen controls and which may be difficult and time consuming to access. For instance, the systems and methods described herein provide fast and efficient engagement of privacy mode with a simple and intuitive device flipping gesture.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Privacy Mode Control System

Figure 2:
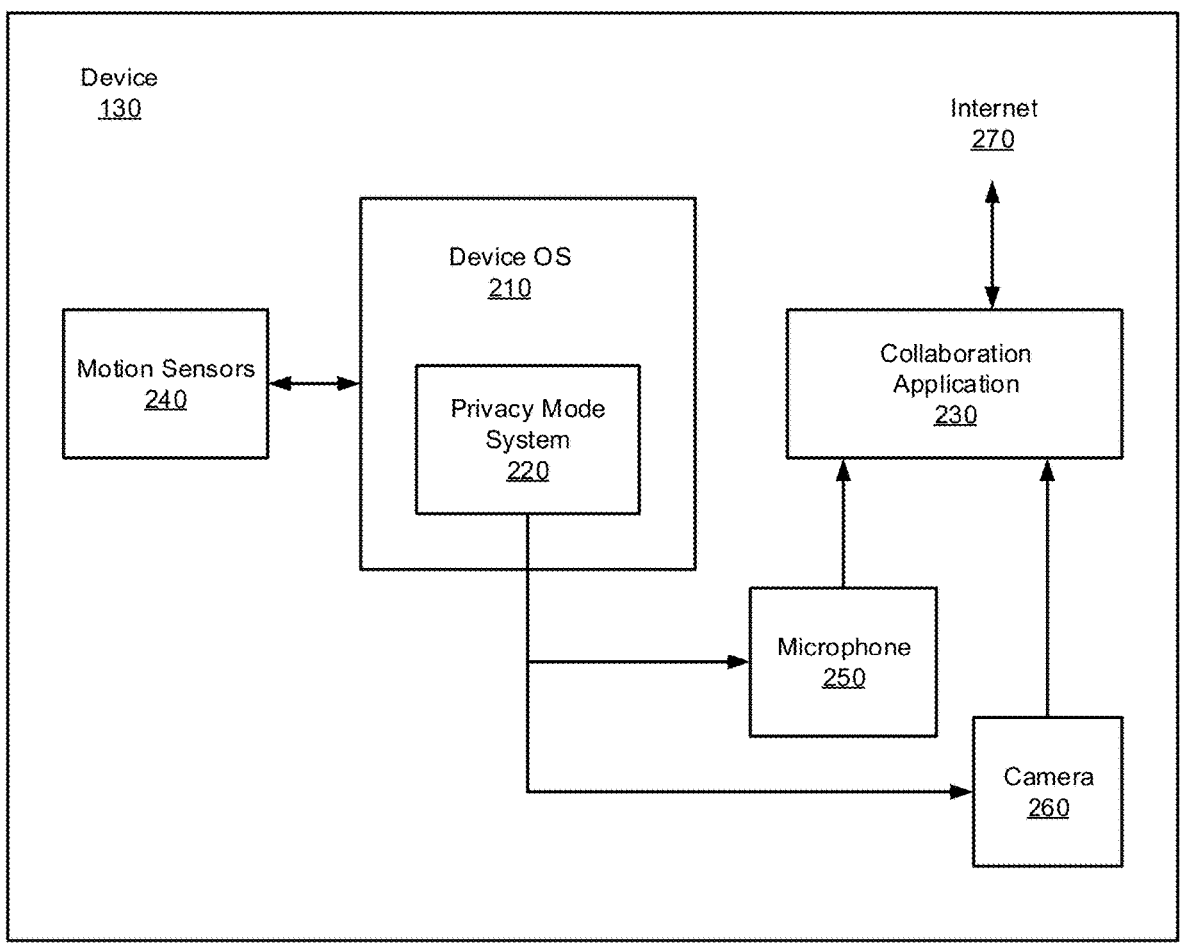
FIG. 2 is a top-level block diagram of an implementation of a system for setting privacy modes based on recognition of device orientation gestures, in accordance with an example of the present disclosure.

FIG. 2 is a top-level block diagram of an implementation 200 of a system for setting privacy modes of a device based on recognition of device orientation gestures, in accordance with an example of the present disclosure. As shown in FIG. 2, the device 130, of FIG. 1, comprises a device operating system (OS) 210, a privacy mode control system 220, motion sensors 240, a microphone 250, and a camera 260. In some cases, the device 130 may be a tablet, smartphone, or other type of mobile device. The device is also configured to execute a collaboration application 230, although in some examples the application 230 may be provided through Software as a Service (SAAS) or as a web based application. In this implementation, the privacy mode control system 220 is incorporated/integrated in the device OS 210.

The collaboration application 230 is configured to provide live collaboration capabilities (e.g., teleconferencing, live streaming, etc.) to a user of the device. As a part of this collaboration process, audio provided by microphone 250 and/or video provided by camera 260 is normally transmitted out over a network, such as the internet 270, to other participants of the process.

Privacy mode system 220 is configured to determine and interpret occurrences of device orientation gestures based on data obtained from motion sensors 240 or other sensors of the device (e.g., accelerometers, gyroscopes, magnetometers, or other inertial measurement units). If the gestures are interpreted to indicate that privacy mode should be turned on or off, as will be described in greater detail below, then the microphone 250 will be muted or unmuted and transmission from the camera 260 will be disabled or enabled, respectively. Additionally, when privacy mode is enabled, screen sharing (and/or other operations that transmit data) may be suspended, delayed, paused, or otherwise disabled. In some cases, the particular actions that are taken during privacy mode may be user or admin configurable. The interruption of the transmission of audio and video is imposed on the device by the OS 210, under control of the privacy mode system 220, without requiring action or cooperation of the collaboration application 230. Thus, collaboration applications, which may be provided by numerous different third party vendors, do not need to be modified to take advantage of the privacy mode system 220.

Figure 3:
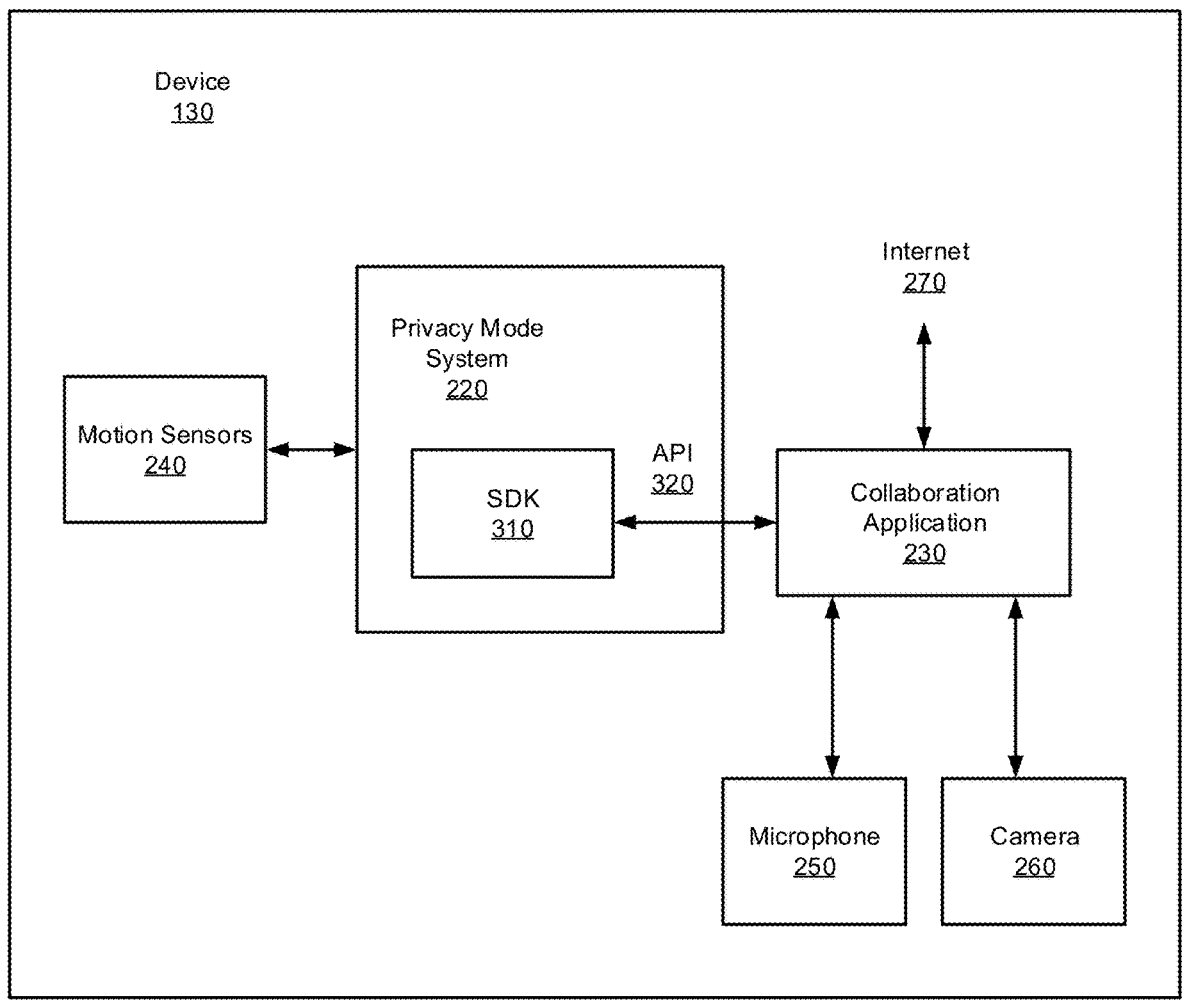
FIG. 3 is a top-level block diagram of another implementation of a system for setting privacy modes based on recognition of device orientation gestures, in accordance with an example of the present disclosure.

FIG. 3 is a top-level block diagram of another implementation 300 of a system for setting privacy modes of a device based on recognition of device orientation gestures, in accordance with an example of the present disclosure. As shown in FIG. 3, the device 130, of FIG. 1, comprises the privacy mode control system 220, motion sensors 240, microphone 250, camera 260, and collaboration application 230, of FIG. 2.

In this implementation, the privacy mode control system 220 further includes an SDK 310 which is configured to provide an API 320 through which the collaboration application 230 can utilize the privacy mode control system 220. In this approach, unlike the implementation described above for FIG. 2, no modification of a device OS is required to incorporate privacy mode functionality. Instead, the collaboration application 230 of this example interacts directly with the privacy mode system 220. This approach, however, does require that each collaboration application be customized to interact with the privacy mode system to provide that functionality. For example, the collaboration application 230 can receive messages or notifications through the API 320 that result from device orientation gesture interpretations (by the privacy mode system 220) indicating that privacy mode should be engaged or disengaged. The collaboration application can then take appropriate action to directly mute or unmute the microphone 250, disable or enable the camera 260, and suspend or resume screen sharing (e.g., without relying on the device OS to perform those functions). Here again, the particular actions that are taken to implement privacy mode may be user or admin configurable.

Privacy Mode Control Process

As described above, some examples of the system 220 of FIG. 2 are configured to perform a process for controlling the privacy mode of a device based on device orientation gestures. The processes may be executed on a processor of any suitable type (e.g., processor 610 of FIG. 6). The processes may further be implemented through execution of an operating system of the device 210, of FIG. 2, or as an SDK 310, of FIG. 3, which is provided for use by the collaboration application 230, of FIG. 2.

Figure 4:
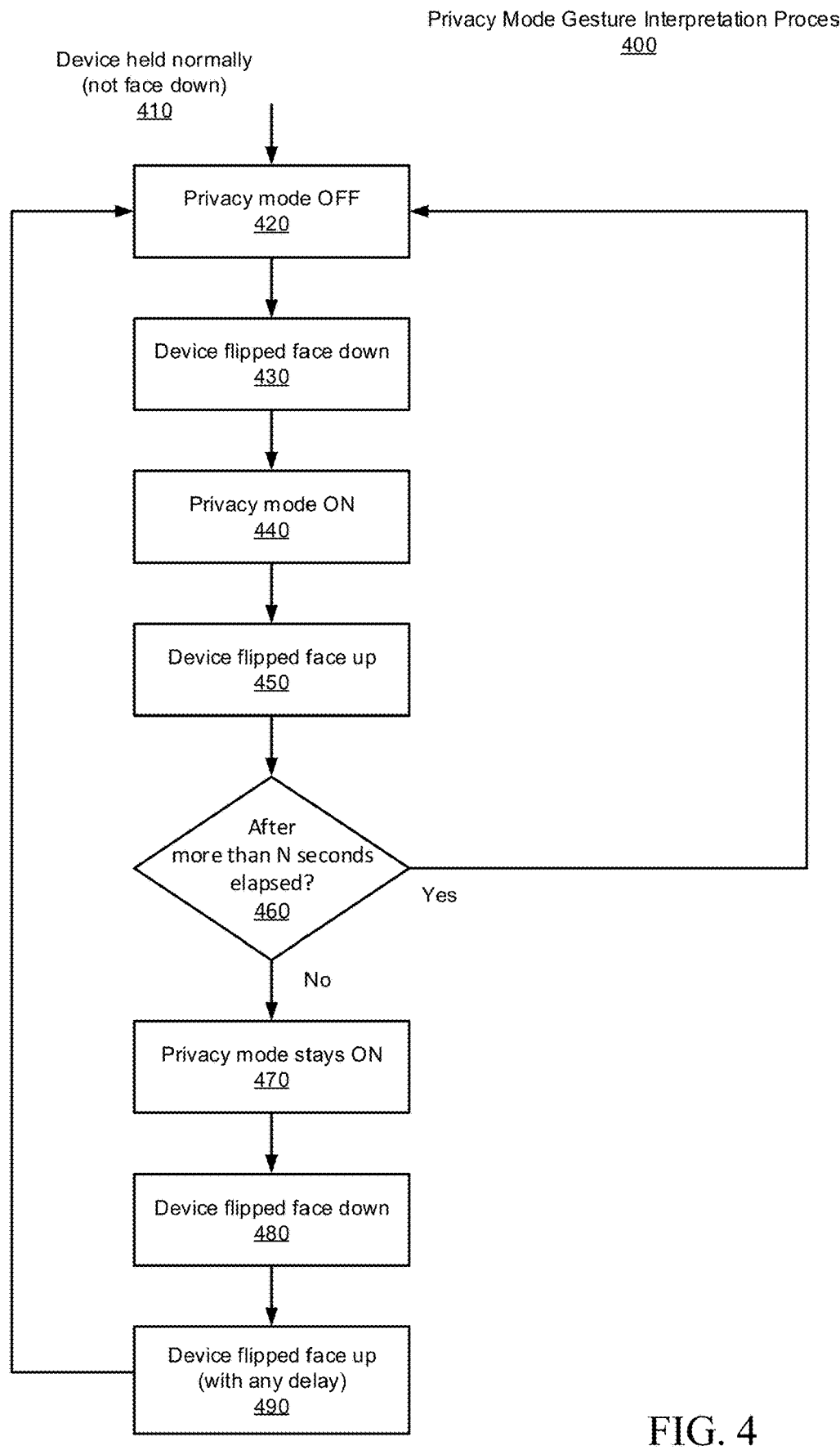
FIG. 4 is a flow diagram of a process for privacy mode gesture interpretation, in accordance with an example of the present disclosure.

FIG. 4 is a flow diagram of a process 400 for privacy mode gesture interpretation, in accordance with an example of the present disclosure.

The process 400 starts with the device held in a position and orientation that is normal or typical for device usage 410. In some examples, such typical usage may include being held in front of the user's face (e.g., in a book reading positions), being held next to the user's ear, or being held out at arm's length for others to see.

At operation 420, the privacy mode is set to an off-state 420 as a default setting, although this is not required. In some examples, the default setting can be an on-state, in which case the process would start at operation 440 below. In some examples, the processor sets 420 the privacy mode to an off-state by altering a value of a privacy mode field stored in memory.

Next, at operation 430, a determination of an occurrence of a first device orientation gesture indicates that the device is flipped face down (or into a position associated with privacy, as previously described). In response to the determination, the privacy mode is set to an on-state at operation 440, in which a functionality of the device is modified or changed (e.g., microphone muted or camera disabled). For instance, in some examples, the processor sets 430 the privacy mode to an on-state by altering a value of a privacy mode field or state variable stored in memory, in response to the determination. The state variable may then be accessed by a monitoring process which acts in response to the change, although it will be appreciated that any suitable software design or process may be employed to accomplish the toggling of privacy mode.

At operation 450, a determination of an occurrence of a second device orientation gesture indicates that the device is flipped back to face up. In response to the determination, at operation 460, if more than N seconds had elapsed between the first and second device orientation gestures, then control proceeds back to operation 420 and the privacy mode is set back to an off-state. In some examples, N seconds is a pre-determined or a user adjustable threshold value. In some examples, N is in the range of one to three. This branch of the process flowchart describes a feature that allows the user to quickly engage privacy mode during an intermission period in which the device will not be used. The intermission feature is activated by flipping the device face down, for example onto a desk surface, and leaving it in that position for a period of time during which the user wishes to remain in privacy mode without use of the device. The user can then exit the intermission and turn off privacy mode by simply picking up the device (e.g., flipping it back to face up), after at least N seconds.

Alternatively, if N seconds or less had elapsed between the first and second device orientation gestures, then at operation 470, the privacy mode is maintained in an on-state. This branch of the process flowchart describes a feature that allows the user to quickly engage privacy mode by briefly flipping the device face down and then back to face up so that the device can continue to be used with privacy mode engaged (e.g., in the on-state).

At operations 480 and 490, a determination of an occurrence of a third device orientation gesture indicates that the device is flipped back to face down and then subsequently flipped to face up regardless of time delay between each flip. In response to the determination control proceeds back to operation 420 and the privacy mode is set back to an off-state. This sequence of gestures (i.e., flipping the device face down and then back to face up) allows the user to exit the privacy mode state that was engaged at operation 470 while the device remained in use.

Figure 5:
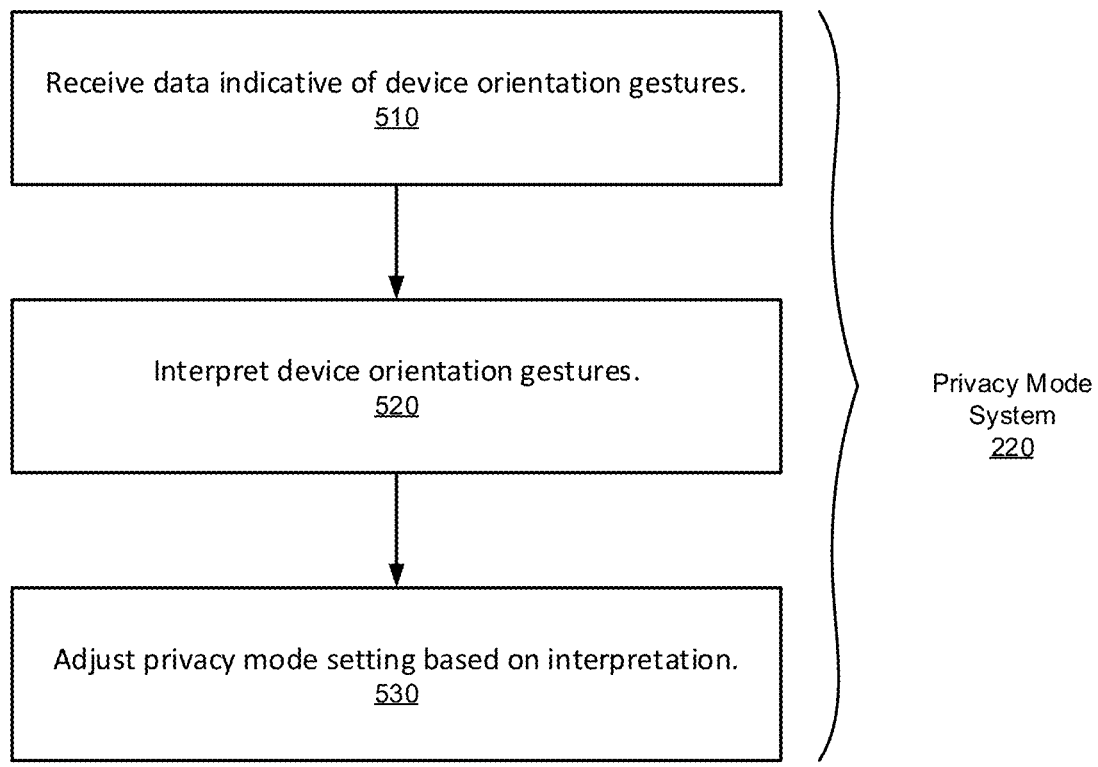
FIG. 5 is another flow diagram of a process for controlling the privacy mode of a device, in accordance with an example of the present disclosure.

FIG. 5 is a flow diagram of another process 500 for controlling the privacy mode of a device, executed by privacy mode control system 220, of FIG. 2, in accordance with an example of the present disclosure.

The process 500 starts at operation 510, by receiving data indicative of one or more device orientation gestures. The gestures include flipping the device face down, 110 of FIG. 1, flipping the device face up, 120 of FIG. 1, or a sequence of one or more such flipping actions separated by either long or short time intervals. A long time interval may be distinguished from a short time interval by comparison to a threshold time interval (e.g., 1 second, 2 seconds, or 4 seconds) that can be a pre-determined or configurable parameter. Occurrences of these flipping actions can be determined through the use of sensors (e.g., motion sensors 240, of FIG. 2) which are integrated in the device and can be accessed through APIs provided by the device OS.

Next, at operation 520, the gestures are interpreted to determine user privacy intentions associated with the gestures. For example, flipping the device face down briefly and then back up is interpreted as a desire to engage privacy mode while continuing to use the device. A subsequent flipping of the device face down and back up is interpreted as a desire to disengage privacy mode.

As another example, flipping the device face down for an extended period of time is interpreted as a desire to engage an intermission privacy mode (e.g., privacy while not using the device). A subsequent flipping of the device face up is interpreted as a desire to disengage privacy mode and resume use of the device.

At operation 530, privacy mode settings are adjusted, as previously described, based on the interpretation. In some examples, a privacy mode on-state includes muting a microphone of the device, disabling video transmission from a camera of the device, and/or suspending screen sharing through the collaboration application. In some examples, a privacy mode off-state includes unmuting the microphone, re-enabling video transmission from the camera, and/or resuming screen sharing through the collaboration application.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Controlling the Privacy Mode of a Device

Figure 6:
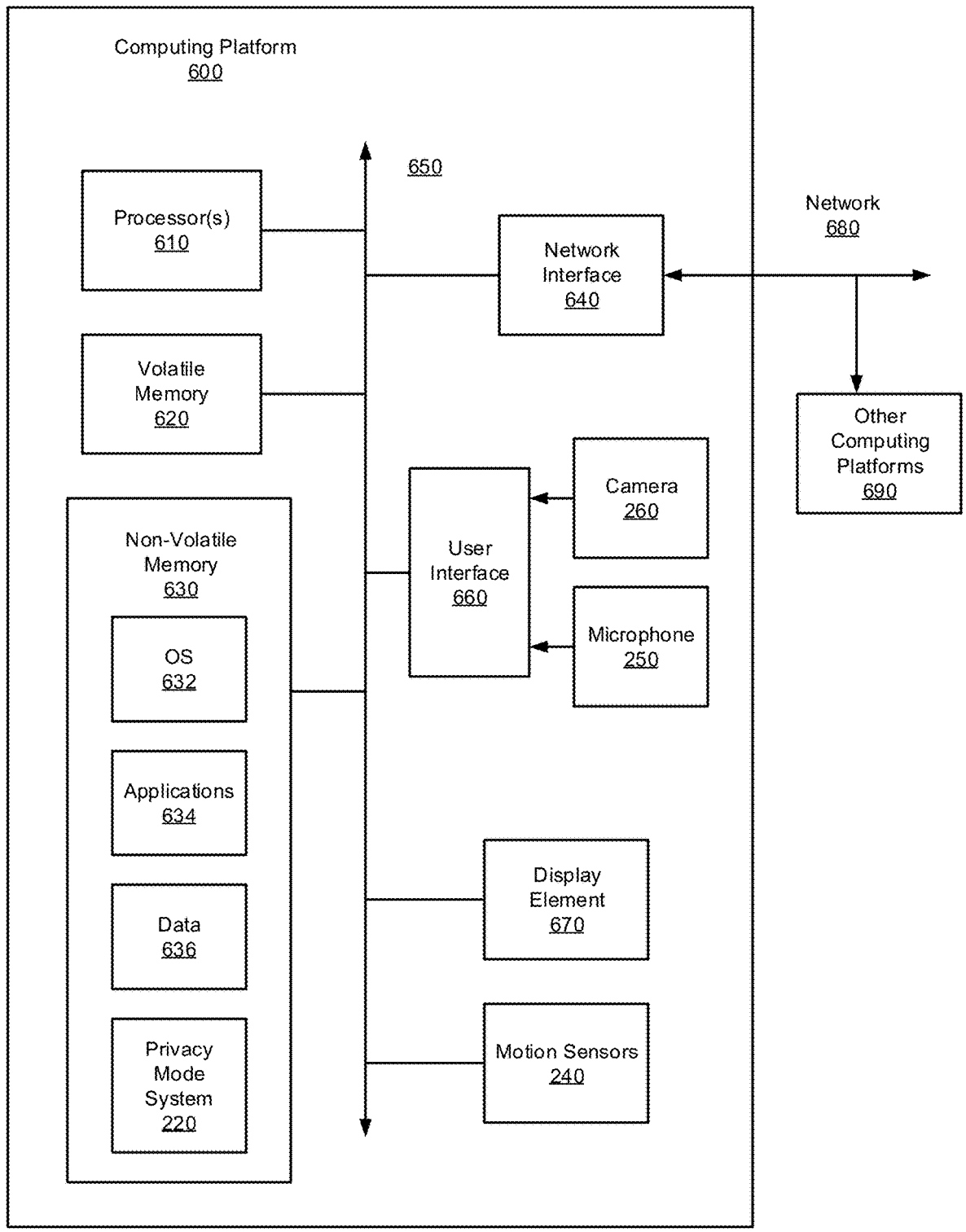
FIG. 6 is a block diagram of a computing platform configured to perform a process for controlling the privacy mode of the platform/device, in accordance with an example of the present disclosure.

FIG. 6 is a block diagram of a computing platform or device 600 configured to perform a process for controlling the privacy mode of the device, in accordance with an example of the present disclosure. In some cases, the platform/device 600 may be a tablet, smartphone, or other type of mobile device.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, speakers, one or more biometric scanners, one or more environmental sensors, and a microphone 250, a camera 260, and one or more motion sensors 240, of FIG. 2, etc.).

The display element 670, can provide a graphical user interface (GUI) and in some cases, may be a touchscreen or any other suitable display device.

The non-volatile memory 630 stores an operating system 632, one or more applications 634 (including web browsers and collaboration applications 230, of FIG. 2), data 636, and elements of privacy mode control system 220 of FIG. 2, such that, for example, computer instructions of the operating system 632, the applications 634, and the elements of privacy mode control system 220, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A mobile computing device comprising:
 a memory;
 a sensor; and
 at least one processor coupled to the memory and configured to:
 determine an occurrence of one or more gestures based on data provided by the sensor, the gestures indicative of an orientation of the mobile computing device, the orientation comprising a face up orientation or a face down orientation; and
 adjust a setting for use by an application in response to the determination, the setting associated with a privacy mode;
 adjust the setting to one of an on-state or an off-state in response to determining an occurrence of one of the gestures, the one of the gestures comprising flipping the mobile computing device between a face down orientation or a face up orientation and leaving the mobile computing device in the face down orientation or the face up orientation for less than a threshold time period; and
 adjust the setting to an on-state in response to determining an occurrence of a first of the gestures, wherein the first gesture comprises turning the mobile computing device face down and leaving the mobile computing device face down for less than a threshold time period.

2. The mobile computing device of claim 1, wherein the application is a collaboration application.

3. The mobile computing device of claim 1, wherein:
 to determine comprises to determine an occurrence of a gesture associated with a privacy mode on-state; and
 to adjust comprises one or more of to mute a microphone of the mobile computing device, to disable video transmission from a camera of the mobile computing device, and to suspend screen sharing.

4. The mobile computing device of claim 1, wherein:
 to determine comprises to determine an occurrence of a gesture associated with a privacy mode off-state; and
 to adjust comprises one or more of to unmute a microphone of the mobile computing device, to enable video transmission from a camera of the mobile computing device, and to resume screen sharing.

5. The mobile computing device of claim 1, wherein the at least one processor is further configured to adjust the setting to an on-state in response to determining an occurrence of a first of the gestures, wherein the first gesture comprises turning the mobile computing device face down and leaving the mobile computing device face down for more than a threshold time period, and the at least one processor is further configured to adjust the setting to an off-state in response to determining an occurrence of a second of the gestures, wherein the second gesture comprises turning the mobile computing device face up.

6. The mobile computing device of claim 1, wherein the at least one processor is further configured to maintain the setting in the on-state in response to determining an occurrence of a second of the gestures, wherein the second gesture comprises turning the mobile computing device face up.

7. The mobile computing device of claim 6, wherein the at least one processor is further configured to adjust the setting to an off-state in response to determining an occurrence of a third of the gestures, wherein the third gesture comprises turning the mobile computing device face down followed by turning the mobile computing device face up.

8. A method for controlling a privacy mode comprising:
 determining, by a computer system of a mobile device, an occurrence of one or more gestures based on data provided by a sensor of the mobile device, the gestures indicative of an orientation of the mobile device, the orientation comprising a face up orientation or a face down orientation; and
 adjusting, by the computer system, a setting for an application in response to the determination, the setting associated with a privacy mode;
 adjusting, by the computer system, the setting to one of an on-state or an off-state in response to determining an occurrence of one of the gestures, the one of the gestures comprising flipping the mobile computing device between a face down orientation or a face up orientation and leaving the mobile computing device in the face down orientation or the face up orientation for less than a threshold time period; and
 adjusting the setting to an on-state in response to determining an occurrence of a first of the gestures, wherein the first gesture comprises turning the mobile device face down and leaving the mobile device face down for less than a threshold time period.

9. The method of claim 8, wherein the application is a collaboration application.

10. The method of claim 8, wherein:
 determining comprises determining an occurrence of a gesture associated with a privacy mode on-state; and adjusting comprises one or more of muting a microphone of the mobile device, disabling video transmission from a camera of the mobile device, and suspending screen sharing.

11. The method of claim 8, wherein:

determining comprises determining an occurrence of a gesture associated with a privacy mode off-state; and adjusting comprises one or more of unmuting a microphone of the mobile device, enabling video transmission from a camera of the mobile device, and resuming screen sharing.

12. The method of claim 8, wherein adjusting comprises adjusting the setting to an on-state in response to determining an occurrence of a first of the gestures, wherein the first gesture comprises turning the mobile device face down and leaving the mobile device face down for more than a threshold time period, and adjusting further comprises adjusting the setting to an off-state in response to determining an occurrence of a second of the gestures, wherein the second gesture comprises turning the mobile device face up.

13. The method of claim 8, wherein adjusting further comprises maintaining the setting in the on-state in response to determining an occurrence of a second of the gestures, wherein the second gesture comprises turning the mobile device face up.

14. The method of claim 13, wherein adjusting further comprises adjusting the setting to an off-state in response to determining an occurrence of a third of the gestures, wherein the third gesture comprises turning the mobile device face down followed by turning the mobile device face up.

15. A non-transitory computer readable medium storing executable sequences of instructions to control a privacy mode, the sequences of instructions comprising instructions to:

determine an occurrence of one or more gestures based on data provided by a sensor of a mobile device, the gestures indicative of an orientation of the mobile device, the orientation comprising a face up orientation or a face down orientation; and adjust a setting for use by an application in response to the determination, the setting associated with a privacy mode;

adjust the setting to one of an on-state or an off-state in response to determining an occurrence of one of the gestures, the one of the gestures comprising flipping the mobile computing device between a face down orientation or a face up orientation and leaving the mobile computing device in the face down orientation or the face up orientation for less than a threshold time period; and adjust the setting to an on-state in response to determining an occurrence of a first of the gestures, wherein the first gesture comprises turning the mobile device face down and leaving the mobile device face down for more than a threshold time period and adjust the setting to an off-state in response to determining an occurrence of a second of the gestures, wherein the second gesture comprises turning the mobile device face up.

16. The computer readable medium of claim 15, wherein:

the determination comprises determining an occurrence of a gesture associated with a privacy mode on-state; and the adjusting comprises one or more of muting a microphone of the mobile device, disabling video transmission from a camera of the mobile device, and suspending screen sharing.

17. The computer readable medium of claim 15, wherein:

the determination comprises determining an occurrence of a gesture associated with a privacy mode off-state; and the adjusting comprises one or more of unmuting a microphone of the mobile device, enabling video transmission from a camera of the mobile device, and resuming screen sharing.

\* \* \* \* \*